A. H. Spencer,
Wringer.
No. 111,484. Patented Jan. 31. 1871.
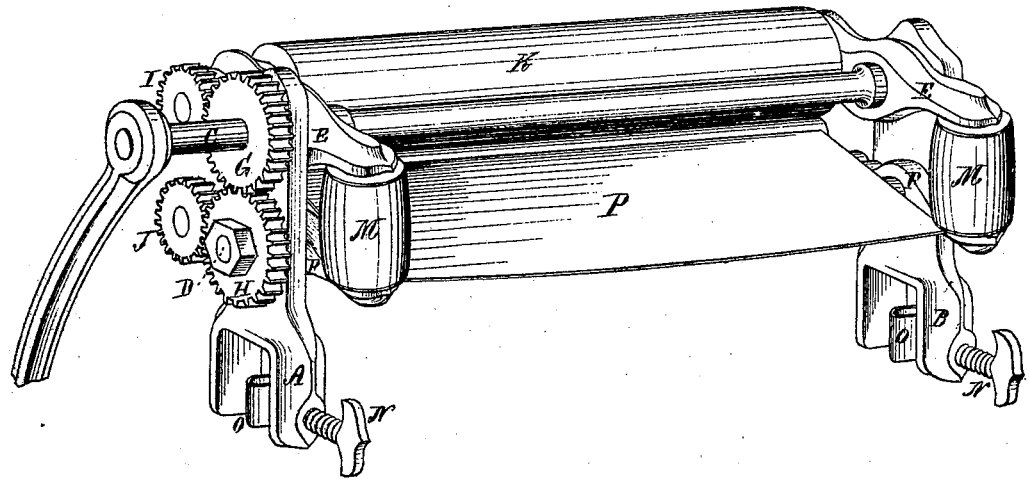
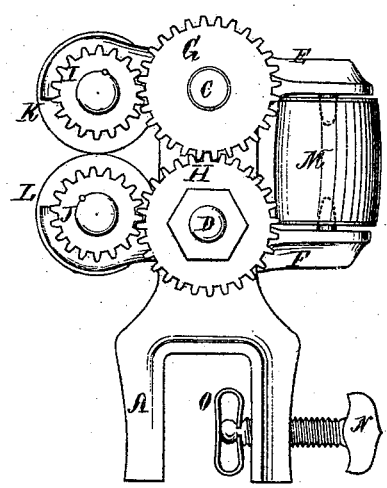
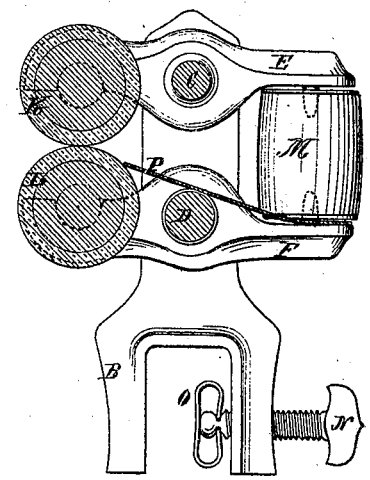
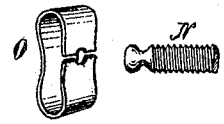
Witnesses.
Phil. R. Larner
F. A. Jackson
Inventor.
A. H. Spencer
By Wm C Wood
Atty

United States Patent Office.

ALBERT H. SPENCER, OF PROVIDENCE, RHODE ISLAND.

Letters Patent No. 111,484, dated January 31, 1871.

IMPROVEMENT IN WRINGING-MACHINES.

The Schedule referred to in these Letters Patent and making part of the same.

*To all whom it may concern:*

Be it known that I, ALBERT H. SPENCER, of Providence, in the county of Providence and State of Rhode Island, have invented certain Improvements in Wringing-Machines, of which the following is a specification.

Nature and Objects of the Invention.

The objects I have sought to accomplish are—

First, to so arrange the cog-wheels of a wringer that their action shall not be affected by extreme compression or by great separation of the rollers.

Second, to permit a yielding action to the bearings of the lower as well as to those of the upper roller.

Third, to apply the power between the gears of the pressure-rollers instead of at one end of the chain of gearing.

General Description.

Figure 1 is a perspective view of my machine.
Figure 2 is an end view of the machine.
Figure 3 is a rear view of the same.
Figure 4 is a view of the spring-clamp and screw.

In the drawing—

A B are standards of the machine, united and supported by the cross-bars C D, which also form pivots for the levers E F and axes for the gear-wheels G H.

These gears mesh with each other, and with the gears I J on the shafts of the pressure-rollers K L, which have their bearings near one end of the levers E F, and are compressed by the spring M, placed between their opposite ends.

A projecting flange or pin serves to retain the spring in its proper position, and a washer may be interposed to support it or to increase its tension.

The uprights A B (being pierced by the shafts C D, which form the fulcrums of the levers E F) serve to fix the centers of said levers at an unvarying distance from each other, so that separation of the rollers can only accompany a compression of the spring M. Such separation does not, however, affect the gearing. The gear I will continue in mesh with G, and the gear J with H, since the levers are pivoted on the axles of G and H.

Power may be applied to either of the pressure-rollers or to the gears G or H. I prefer, however, to apply it to the shaft C, if made to rotate, or to the gear G, which may revolve on it.

By thus interposing the power between the driven rollers I avoid the back-lash incident to a chain of gearing actuated from one end; and by permitting the bearings of both the upper and lower roller to yield in arcs of circles described from the centers of C and D, I obviate the objections heretofore raised against a chain of gears where the separation of the rollers was due alone to the rising of the upper one, the lower receiving the crank and rotating at a fixed point.

By making the gears I J two-thirds the diameter of G H, I increase the speed of the pressure-rollers one-half, which will greatly expedite the work of the machine. The rate of speed may thus be readily increased to any desired extent by varying the sizes of the gears—another advantage of the application of power to the intermediate gears.

The uprights A B are furnished at their lower ends with jaws and clamp-screws for attaching the wringer to a tub or box.

The points of the screws N are clothed with clamps O, composed of a strip of sheet metal bent into suitable form and sprung over the point of the screw after its insertion through the standard—a much simpler process than riveting on a plain head. The curved form of the face of this clamp gives it a spring action, enabling it to clasp tightly when moved by the screw without defacing the tub or box.

After the clothes have passed between the rubber rollers K L, they are received upon the slide P, fig. 1, which delivers them from the machine.

A ring around the shaft D secures this slide in its place, and enables it to adjust itself to the varying position of the rollers, its lower corners resting on the lever F.

I claim as my invention—

1. The independent axes C D, serving as fulcrums for the levers E F and as braces for the whole machine.

2. The pressure-levers E F, hinged on the axes of the intermediate gears, and forming yielding bearings for the rollers K L.

3. A pair of wringing-rollers, provided with end gears and mounted in yielding bearings, in combination with and operated by a driving and an intermediate gear, respectively mounted upon fixed bearings, the several gears being so arranged that their relative working positions will remain the same whether the rolls be in close contact or widely separated, substantially as described.

4. The clamp O, formed of a piece of elastic sheet metal bent curved and attached to the screw N, as described.

5. The uprights A B, pivots C D, and levers E F, in combination with the gear-wheels G H I J, pressure-rollers K L, and spring M.

ALBERT H. SPENCER.

Witnesses:
WM. H. GREENE,
DANIEL A. HUNT.